US010331702B2

(12) United States Patent
Bilimoria et al.

(10) Patent No.: US 10,331,702 B2
(45) Date of Patent: Jun. 25, 2019

(54) GENERATING RECOMMENDATION CLUSTERS IN A SOCIAL NETWORK

(71) Applicant: Microsoft Technology Licensing, LLC, Redmond, WA (US)

(72) Inventors: Zal Yaz Bilimoria, San Francisco, CA (US); Abhishek Gupta, San Francisco, CA (US); Kun Liu, Sunnyvale, CA (US); Anmol Bhasin, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 14/286,879

(22) Filed: May 23, 2014

(65) Prior Publication Data

US 2014/0351259 A1 Nov. 27, 2014

Related U.S. Application Data

(60) Provisional application No. 61/826,600, filed on May 23, 2013.

(51) Int. Cl.
G06F 16/28 (2019.01)
G06F 16/95 (2019.01)
G06Q 50/00 (2012.01)

(52) U.S. Cl.
CPC ............ *G06F 16/285* (2019.01); *G06F 16/95* (2019.01); *G06Q 50/01* (2013.01)

(58) Field of Classification Search
CPC ......... G06F 17/30598; G06F 17/30539; G06F 17/30002; G06F 17/30702; G06F 17/30; G06F 17/30699; G06F 17/30867; G06F 17/30861; G06F 17/30259; G06F 17/3053; G06F 17/30705; G06F 17/3071; G06F 17/30277; G06F 17/30873; G06F 17/30943; G06F 17/30958; G06F 17/248; G06F 17/30595; G06F 17/30864; G06F 17/18;

(Continued)

(56) References Cited

U.S. PATENT DOCUMENTS 7,680,770 B1 * 3/2010 Buyukkokten ........ G06Q 10/10
340/573.1
8,849,740 B2 * 9/2014 Liu ........................ G06Q 10/06
706/48

(Continued)

*Primary Examiner* — Arpan P. Savla
*Assistant Examiner* — Cecile Vo
(74) *Attorney, Agent, or Firm* — Schwegman Lundberg & Woessner, P.A.

(57) ABSTRACT

Techniques for generating recommendation cluster within a social network service are described. Consistent with some embodiments, sample members in a social network service are identified. The sample members may be associated with prior member activity involving a source member. A cluster category this then selected based on a member attribute shared by a plurality of the sample members. In turn, a recommendation cluster is generated based on the selected cluster category. Generating the recommendation duster may involve selecting member profiles that match the cluster category. The member profiles selected in this way form the recommendation cluster. One or more of the member profiles of the recommendation cluster are then surfaced to a client device operated by the source member.

15 Claims, 5 Drawing Sheets

(58) Field of Classification Search
CPC ......... G06F 17/30312; G06F 17/30424; G06F 16/9535; G06F 16/285; G06F 16/24578; G06F 16/951; G06F 16/248; G06F 16/9038; G06F 16/95; G06F 16/335; G06F 16/337; G06F 16/355; G06F 16/435; G06F 16/635; G06F 16/958; G06Q 50/01
USPC ....... 705/14.58, 321; 707/999.102, E17.059, 707/E17.089, E17.109, E17.141, 731, 707/732, 737, E17.046, 723, 748, 749, 707/E17.032, E17.071, 784, 733, 791, 707/793, 798, 736, 803, 722, 758, 707/E17.084, 734, 740, 771
See application file for complete search history.

(56) References Cited

U.S. PATENT DOCUMENTS

| | | | | |
|---|---|---|---|---|
| 9,462,004 | B1* | 10/2016 | Desikan | H04L 63/104 |
| 2006/0229896 | A1* | 10/2006 | Rosen | G06Q 10/10 |
| | | | | 705/321 |
| 2009/0030932 | A1* | 1/2009 | Harik | G06F 16/9024 |
| 2011/0313963 | A1* | 12/2011 | Liu | G06Q 10/06 |
| | | | | 706/48 |
| 2012/0166285 | A1* | 6/2012 | Shapiro | G06Q 30/0251 |
| | | | | 705/14.58 |
| 2016/0098683 | A1* | 4/2016 | Angulo | G06Q 10/1053 |
| | | | | 705/321 |

* cited by examiner

GENERATING RECOMMENDATION CLUSTERS IN A SOCIAL NETWORK

RELATED APPLICATIONS

This application claims priority to U.S. Provisional Patent Application No. 61/826,600, entitled, Methods and Systems for Generating Recommendation Clusters in a Social Network, filed on May 23, 2013, which is incorporated by reference herein in its entirety.

TECHNICAL FIELD

The present disclosure generally relates to data processing systems. More specifically, the present disclosure relates to methods, systems, and computer program products for generating recommendations of members of a social network service.

BACKGROUND

A social network service may be a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

DESCRIPTION OF THE DRAWINGS

Some embodiments are illustrated by way of example and not limitation in the FIGs. of the accompanying drawings, in which.

DETAILED DESCRIPTION

Figure 1:
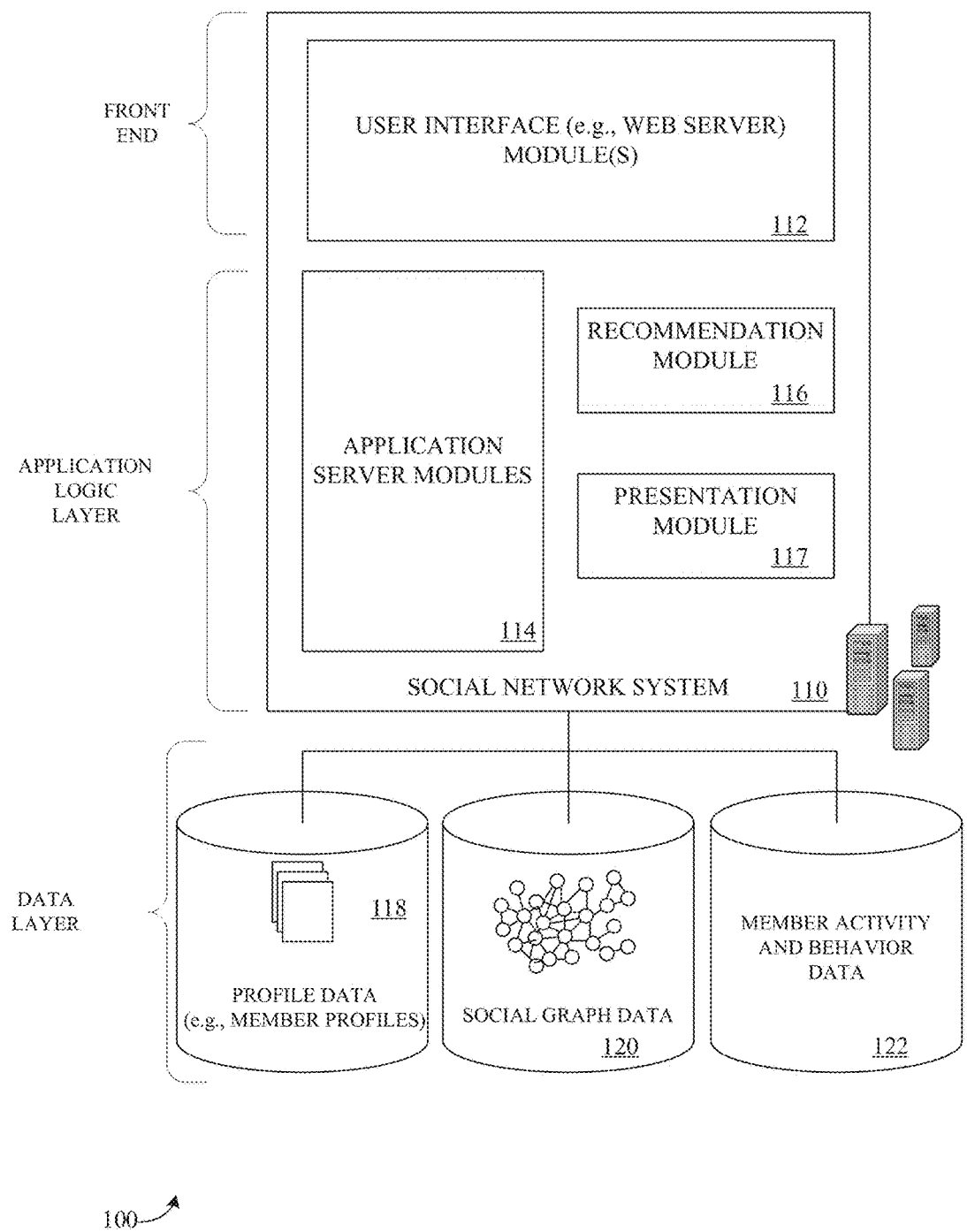
FIG. 1 is a block diagram illustrating various components or functional modules of a social network service, consistent with some embodiments.

The present disclosure describes methods, systems and computer program products that individually or in combination generate recommendations of members of a social network service to other members of the social networking system. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Consistent with some embodiments, a social network service provides a member (referred herein as a "source member") with a recommendation service that generates recommendation clusters that recommend members of the social network service that may be of interest to the source member. To generate the recommendation clusters, example embodiments of the recommendation service may track activities performed by the source member. For example, some embodiments of the recommendation service may track the profiles that the source member visited or the profiles the source member messaged. The members that have been involved with member activity from the source member may be referred to as sample members.

Based on the tracked activities, example embodiments may then identify one or more cluster categories. A "cluster category" may be a term that refers to one or more attributes shared by the members of the sample members. By way of example and not limitation, the source member may have viewed a number of member profiles that list Acme Inc. as an employer. Accordingly, working at Acme Inc. may be a cluster category. In some embodiments, multiple cluster categories are identified by the recommendation service to form multiple recommendation clusters.

For each of the identified cluster categories, the recommendation service may then generate a recommendation cluster based on matching candidate members with the identified cluster categories. The term "candidate members" may refer to a group of members that selections for a recommendation cluster are made. That is, the candidate members may define a search space for forming a recommendation cluster. In some cases, the candidate members may be connected to the sample members. In some cases, the candidate members may be identified as having an interest or intent that matches the intent of the source member. Still further, in some cases, the candidate members may be member profiles that lack member activity between them and the source member. Continuing with the above example, the recommendation service may generate a recommendation cluster based on the members that also work at Acme Inc.

In some embodiments, the recommendation service may surface the recommendation clusters to the source member. For example, the members corresponding to the "works at Acme Inc." cluster category may be presented together in one cluster interface and other members corresponding to other cluster categories may be presented in other cluster interfaces. The cluster interface may be data or logic that may be used to create an interactive visual display to the source member so that the source member can view the various member profiles associated with the cluster category. In some cases, the source member may interact with the cluster module by cycling through the various members of the recommendation cluster.

In some cases, the cluster interface may specify evidence of why the members of a recommendation cluster may be relevant to the source member. For example and not by way of limitation, the recommendation service may specify the a given recommendation cluster was generated because the source member visited member profiles with a given cluster category (e.g., company, job title, some combination thereof, or the like). In some embodiments, the evidence may be obfuscated by the recommendation service. For example, rather than listing a particular company or job title, the recommendation service may specify that the members of the cluster are selected because the member visited or messaged a given member.

It is to be appreciated that cluster recommendations may have many practical advantages. For example, some embodiments of the recommendation service may be deployed in or in conjunction with a social network service. As is explained in greater detail below, a social network service may limit certain types of communications. For example, a social network service may limit the communications between a source member and out-of-network members. It is to be appreciated that there may be many reasons a social network service may limit the communications between a source member and out-of-network members. For one, the social network service may use communication rules to limit spam messages. However, there may be legitimate situations for allowing out-of-network communications that may benefit the out-of-network members. Such may be the case where the source member uses the social network service to recruit candidates for an open position within a company, for example, and where the out-of-network member is using the social network service because they are interested to some degree about learning about new career opportunities. Accordingly, the social network service may provide limited communication privileges to the source members to facilitate the exchange of information regarding new job opportunities and job seekers. An example of a limited communication privilege may be the ability to send a determinable number (e.g., 10) of messages to out-of-network members over a period of time (e.g., a month). Such privileges may be offered by the social network service as part of a paid service.

For convenient description, the term "out-of-network" communications may refer to email, messages, instant-messages, text messages, voice messages, or any other communications utilizing the social networking service which is from a source member to a recipient member where the source member and the recipient member do not meet the requirements (e.g., they are not within a particular connection degree) typically required by the social networking service for a communication of that type. While the term "out-of-network communication" implies that the requirement of the social networking service that is being bypassed is a connection degree requirement, the term is used for descriptive convenience and may refer generally to any communication that bypasses rules that a social networking service has with respect to the particular communication. Further, the term "out-of-network" member may refer to a member in the social network service that is not directly connected to the source member in the social network service (e.g., a bidirectional or unidirectional connection was not established between the two members).

Messaging an out-of-network member using one of a limited number of available messages for a time period may be thought of as a type of cost for messaging the out-of-network member. However, there may also be other types of cost for messaging the out-of-network member. Other types of cost for messaging the out-of-network member may include time, reputation, consumption of computer resources (e.g., network bandwidth, computer processing time on the client and servers), and the like.

In some cases the recommendation cluster may reduce these costs because the recommendation cluster provides suggestions of members that may be relevant to the source member. Where the suggestions are relevant, the source member can increase the expected utility for sending the out-of-network message. Further, where the cluster recommendations can limit the number of out-of-net-network messages sent to low relevance members, the social network service can reduce the computational resources used to service those types of out-of-network messages.

These and other example embodiments are now describe in greater detail below.

Example System

FIG. 1 is a block diagram illustrating various components or functional modules of a social network service 100, consistent with some embodiments. As shown in FIG. 1, the front end consists of a user interface module (e.g., a web server) 112, which receives requests from various client-computing devices, and communicates appropriate responses to the requesting client devices. For example, the user interface module(s) 112 may receive requests in the from of Hypertext Transport Protocol (HTTP) requests, or other web-based, application programming interface (API) requests. The application logic layer includes various application server modules 114, which, in conjunction with the user interface module(s) 112, generates various user interfaces (e.g., web pages) with data retrieved from various data sources in the data layer. With some embodiments, individual application server modules 114 are used to implement the functionality associated with various services and features of the social network service. For instance, the ability to generate recommendation clusters for a source member may be services implemented in independent application server modules 114. Similarly, a variety of other applications or services that are made available to members of the social network service will be embodied in their own application server modules 114. For example, with some embodiments, the social network system 110 includes modules that may individually or in combination provide a recommendation service, such as a recommendation module 116 and a presentation module 117. The recommendation module 116 may be a computer-implemented module configured to generate recommendation clusters. As is described below, example embodiments may use a variety of information to generate the recommendation clusters, such as attributes obtained from member profiles the source member viewed, member profiles the source member messaged, search terms used by the member profile, member profiles saved in a contact list by the source member, member profiles "introduced" to the source member by another member, and any other such member activity. Such attributes, as described above, may be referred to as cluster categories.

The presentation module 117 may be a computer-implemented module configured to generate user interface elements for interacting with the identified recommendation cluster. For instance, the presentation module 117 may generate user interface elements that may execute on a client device. For example, the presentation module 117 may generate user interface elements that, when executed on a client device operated by the source member, display one or more recommendation clusters and user interface control elements for interacting with the displayed recommendation clusters.

As shown in FIG. 1, the data layer includes several databases, such as a database 118 for storing profile data. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 118.

Once registered, a member may invite other members, or be invited by other members, to connect via the social network service. A "connection" may require a bi-lateral agreement by the members, such that both members acknowledge the establishment of the connection. It is to be appreciated that members may "connect" with entities other than member profiles, such as companies, groups, or any other suitable cohort. The various associations and relationships that the members establish with other members, or with other entities represented by date stored in the database 118, are stored and maintained within the social graph, shown in FIG. 1 with reference number 120.

The social network service 100 may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service 100 may host various job listings providing details of job openings with various organizations.

As members interact with the various applications, services and content made available via the social network service, the members' behavior (e.g., content (e.g., profiles) viewed, links selected, messages sent, etc.) may be monitored and information concerning the member's behavior may be stored, for example, as indicated in FIG. 1 by the database with reference number 122. This information may be used to classify the member as being in various categories. For example, if the member performs frequent searches of job listings, thereby exhibiting behavior indicating that the member is a likely looking for job opportunities, this information can be used to classify the member as a "job seeker." Additionally, or alternatively, if a member visits member profiles or messages other member profiles, thereby exhibiting behaviour indicating that the member is likely trying to recruit candidates for a job position, this information can be used to classify the member as a "job placer." Thus, example embodiments of the recommendation module 116 may extract further information regarding the member classified as a connection seeker, such as by job title, location, experience level, company, and the like.

Example Data Model

Figure 2:
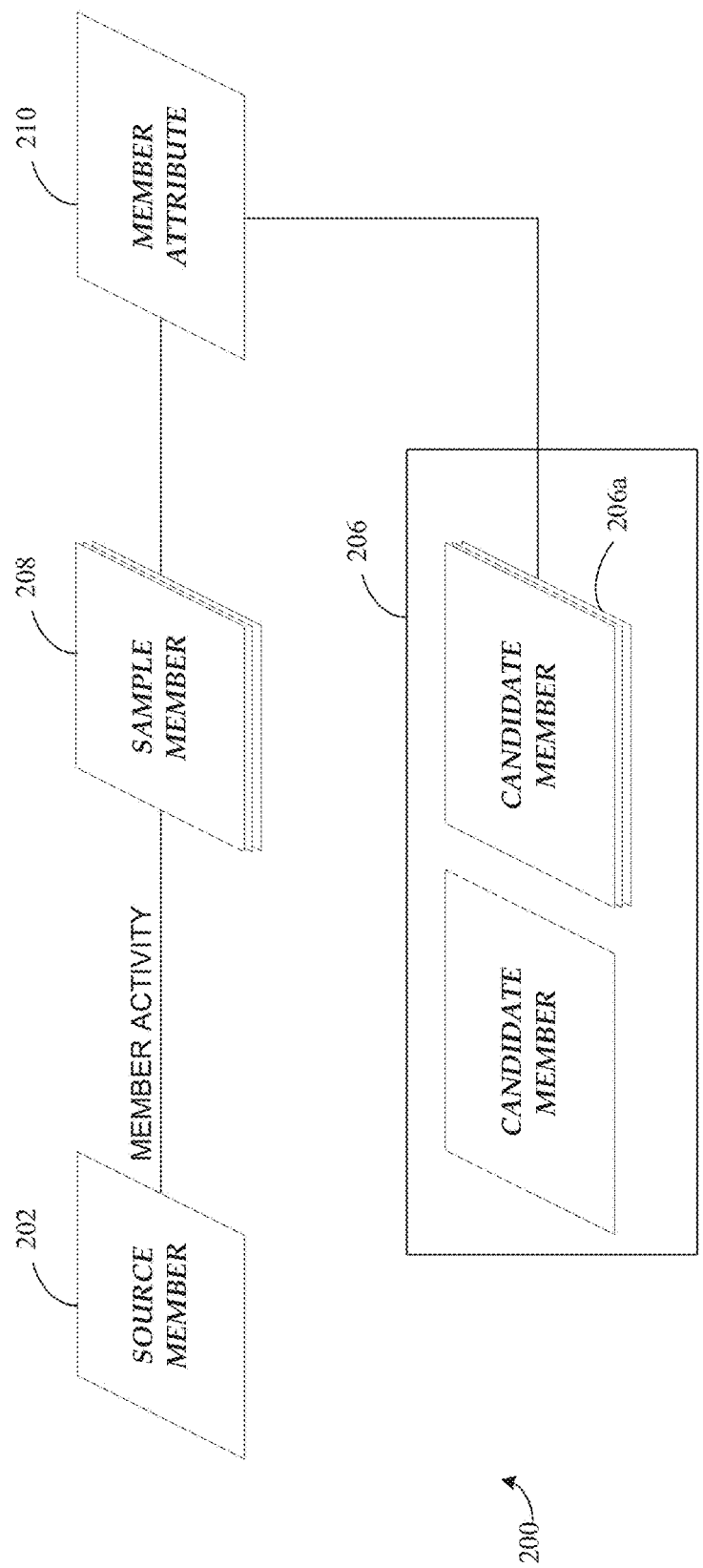
FIG. 2 is a data diagram illustrating an example of a data model, according to an example embodiment.

FIG. 2 is a data diagram illustrating an example of a data model 200, according to an example embodiment. The data model 200 may conceptually describe the data and relationships stored in databases 118, 120, 222. For example, as illustrated in FIG. 2, the data model 200 may include a source member 202, sample members 208, candidate members 206, and a member attribute 210. The source member 202, sample members 208, and the candidate members 206 may be profiles of members of the social network service 100, as may be stored in the database 118. The member attribute 210 may be data or logic representing a skill, job title, geographic location, employer, experience level, or any other suitable attribute. As shown in FIG. 2, the sample members 208 and a subset of the candidate members 206 (e.g., subset candidates 206a) may list the same member attribute.

As FIG. 2 illustrates, the source member 202 may initiate member activities that are performed with respect to the sample members 208. Such member activities may include the operation of visiting the profile page of the sample members 208 or the operation of sending a message to the sample members 208. As an example, the source member 202 may be a recruiter searching the social graph of the social network service 100 for member profiles that may be candidates for a job listing. Accordingly, the source member 202 may perform a search on the social network service for member profiles that match a supplied search criteria. The members that match the supplied search criteria may include the sample members 208, which are then visited by the source member. Data representing the member activities, according to some embodiments, may be stored in the database 122 of FIG. 1. It is to be appreciated that the source member may be, in some embodiments, a member with a given service level agreement (e.g., premium subscribers) or may be using the social networking service 100 for any number of activities, such as recruiting, finding a job opportunity, finding a buyer, networking with a community or likeminded members, finding a seller, and the like.

The candidate members 206 may be member profiles from the social network service 100 that the recommendation module may use as a search space for generating recommendation clusters. In some cases, the candidate member profiles may lack member activity between the source member 202 and the candidate members 206. That is, the source member profile 202 may not have previously communicated, connected, or may otherwise be unfamiliar with the candidate members 206. In some cases, the recommendation module 116 may identify the candidate members 206 based on an inferred intent or interest of the candidate members 206, such as including those members that are "job seekers."

In some embodiments, based on the source member 202 visiting the sample members 208, the recommendation module 116 may recommend the subset candidates 206a from the candidate members 206 to the source member 202 because the subset candidate members 206a share the member attribute 210 in common with the sample members 202. In this case, the member attribute 210 is used as a cluster category and the subset candidate members 206a may represent a recommendation cluster.

It is to be appreciated that the data model 200 shown in FIG. 2 is provided merely for illustration. Some embodiments may use different data models and still be consistent with this disclosure. For example, some embodiments may represent the member attribute as a property or field within a member profile, rather than a separate data object connected via relationship data.

Example User Interface

Figure 3:
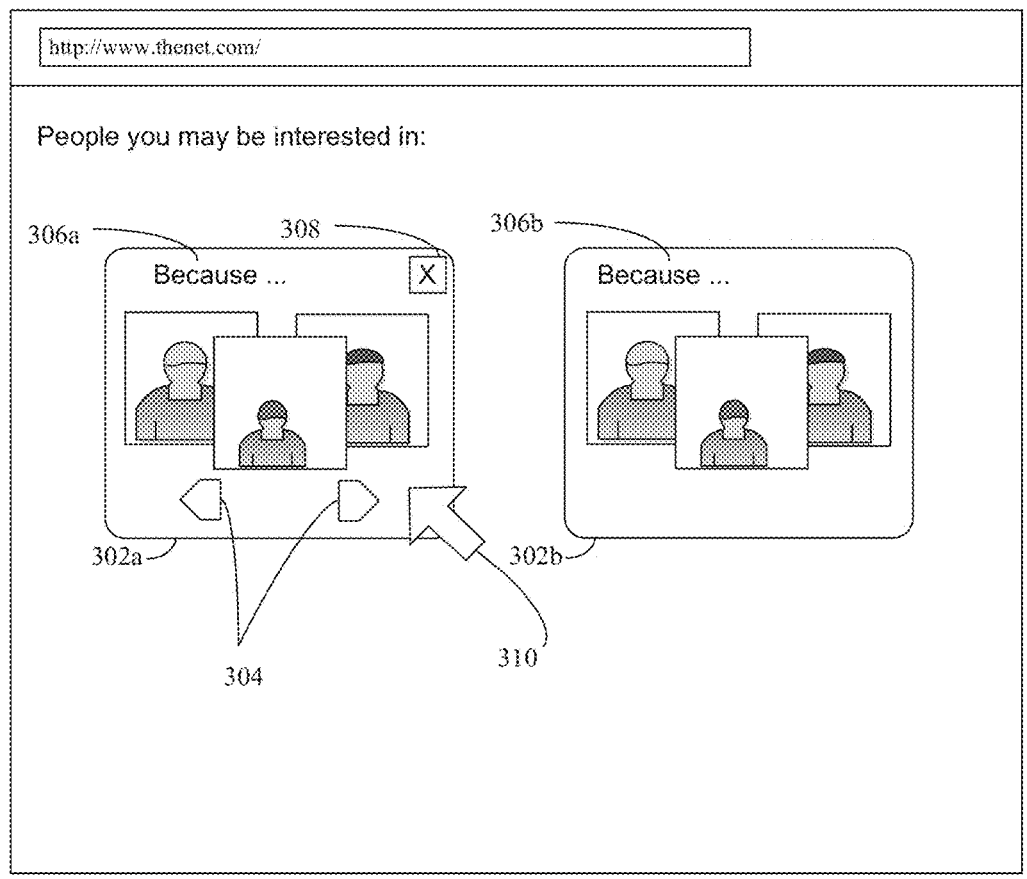
FIG. 3 is a user interface diagram illustrating an example of a user interface or web page for displaying recommendation clusters, consistent with some embodiments.

FIG. 3 is a user interface diagram illustrating an example of a user interface 300 or web page for displaying recommendation clusters, consistent with some embodiments. In example embodiments, the presentation module 217 may generate data representing the user interface 300 in response to recommendation clusters identified by the recommendation module 316.

As illustrated in FIG. 3, the user interface 300 may include cluster display modules 302a and 302b. The cluster display modules 302a and 302b may provide a visual indication of recommendation clusters identified by the recommendation module 116. In example embodiments, the cluster display modules 302a and 302b may each display members belonging to different clusters. As discussed above, a recommendation cluster may group member profiles based a cluster category, which is, in turn, based on one or more member attributes listed by sample profiles. Thus, the cluster display modules 302a and 302b may each individually display multiple member profiles according to a cluster category and the multiple member profiles are therefore relevant for similar reasons. For example, the cluster display module 302a may be used to display member profiles that are each relevant to the source member for similar reasons (e.g., the member profiles list similar employers, geographic locations, skills, or combinations thereof). Grouping member profiles in cluster recommendations may allow efficient searching on behalf of the source member in many cases.

To facilitate comparably meaningful recommendation clusters, the presentation module 117 may display clustering evidence, such as clustering evidences 306a and 306b. In general, the clustering evidences 306a and 306b may identify member attributes that are used to cluster the various member profiles. For example, the clustering evidence 306a may provide an indication that the member profiles are clustered because the source member viewed member profiles from a given or similar company. Other examples of member attributes that may be used as a basis for clustering member profiles are job titles, experience level, education (degree, university, graduation level, and the like). In some cases, the member attribute, or member attributes, used to form a recommendation cluster may be obfuscated. For example, the presentation module 117 may indicate that the member profiles are clustered because a member profile viewed a given member, where the given member may have an attribute that is used to form the recommendation cluster.

According to some embodiments, the cluster display modules 302a and 302b may allow user interactions with the member profiles that form the recommendation clusters. For example, as shown in FIG. 3, the cluster display module 302a includes control elements 304 and module sizer 308. The control elements 304 may be one or more user interface elements that allow the user to change the member profiles shown in the cluster display module 302a responsive to detecting that the user selected one of the scrolling elements 304. For example, upon detecting that the source member selected one of the control elements 304, the presentation module 117 may select a new subset of member profiles in the recommendation cluster to display in the cluster display module 302a. Such an approach for selecting the new subset may be used to simulate a carousel effect or a moving through a list of member profiles.

The module sizer 308 may be a user interface element that may resize the cluster display module 304a. Resizing may be an operation that updates the size or presence of the cluster display module 302a. For example, the module sizer 308 may close and remove the cluster display module 304a if the source member clicks on it, in some embodiments, the cluster display module 302a may include other module sizers, such as a module sizer for changing the dimensions of the cluster display module 302a or another tier moving the relative location of the cluster display module 302a.

In some cases, the control elements 304 and the module sizer 308 may appear on the condition that the source member hovers a input 310 over the cluster display module 302a. The input 310 may be a mouse cursor, a touch screen input, detected focus of eye movement, and the like. In other cases, rather than dynamically appearing on the condition of the user input 310, the display module 302a may display the control elements 304 and the module sizer 308 may make these elements visible to the source member independent of the user input 310.

Example Method for Generating Recommendation Clusters

Figure 4:
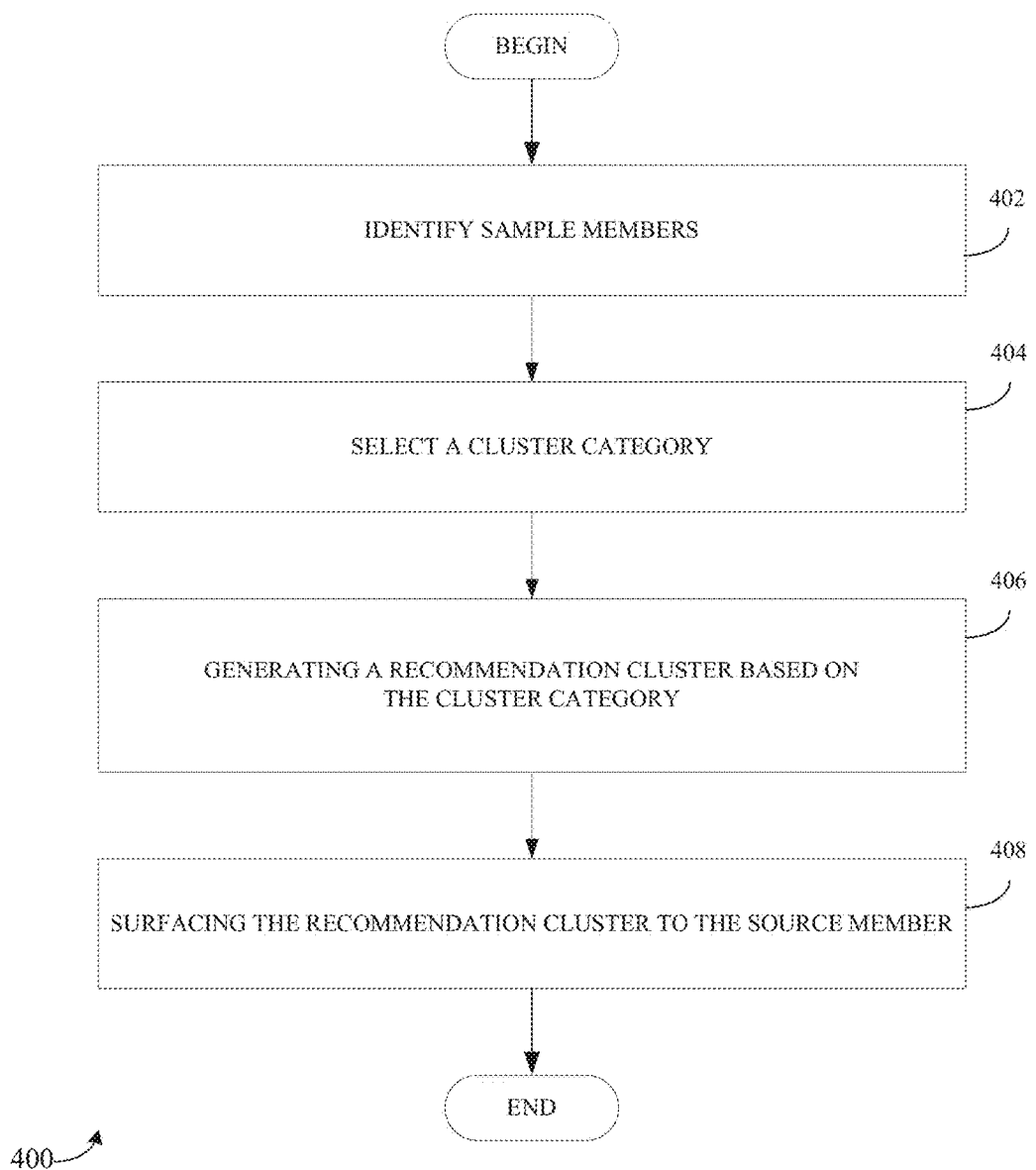
FIG. 4 is a flow diagram illustrating a method of generating recommendation clusters, according to an example embodiment.

FIG. 4 is a flow diagram illustrating a method 400 of generating recommendation clusters, according to an example embodiment. The method 400 may begin at operation 402 when an application or service (e.g., the recommendation module 116) of the social network system 110 identifies sample members that can be used to generate a recommendation cluster. In an example embodiment, the sample members may be members of the social network service that the source member has previously interacted with. For example, some embodiments may identify those members that the source member has sent a message to in the past or has previously visited. As described above, "visiting" may be a term that can refer to an action provided by the social network service where one member (e.g., the source member) can view the profile, or some subset thereof, of another member. As described above, visiting and messaging members are examples of member activity that may be stored in the database 122 of FIG. 1. Other examples of member activity that may be used to identify sample members include search terms used by the member profile to identify relevant members, member profiles saved in a contact list by the source member, member profiles "introduced" to the source member by another member, and any other such member activity.

At operation 404, the recommendation module 116 may select one or more cluster categories based on member attributes shared by one or more of the sample members. For example, some portion of the sample members may be employed by the same company, or some portion of the sample members may have the same job title. It is to be appreciated that where there are multiple member attributes that can be used to select a cluster category, the selection can be performed using any number of methods. For example, one example embodiment may select the member attribute being listed by the most member profiles. In another example, the member attributes may be selected at random. Still further, other example embodiments may use a commonality threshold to filter out those member attributes that are only shared by a limited number of member profiles. It is of course possible that some embodiments may use any number of the above techniques to select a cluster category.

At operation 406, the recommendation module 116 may generate a recommendation cluster based on the cluster category selected by operation 404. For example, the recommendation module 116 may identify those member profiles in the social network service that list the member attributes that form the cluster category. For example, if the cluster category is the member attribute that specifies an employer, then operation 406 may identify member profiles that also work at the specified employer. In some embodiments, the recommendation module 116 may further identify the member profiles that form the recommendation cluster based on techniques for identifying the intents of the candidate profiles and or the source member, as is discussed in greater detail below. Examples of intent may include job seeker and employee finder. Accordingly, the recommendation module 116 may only select those member profiles that are identified as potential job seekers.

At operation 408, the recommendation module 116 may surface the recommendation cluster to the source member. With reference to FIG. 3, the recommendation module 116 may cause the presentation module 117 to generate the user interface 300 that displays the cluster display modules 302a and 302b. The cluster display modules 302a and 302b may allow the source member to interact with and to view the member profiles that may be relevant to the interest of the source member.

Although the many examples presented herein involve publishing query messages or status updates to a content stream, in other embodiments, the same member targeting logic may be used to communicate query messages using a wide variety of communication channels. For example, the member targeting logic described herein may be used to communicate an email message, a text message, or any other type of message. With some embodiments, a messaging interface may allow the query message author to select the particular communication channel (e.g., status update, email, text message, etc.) by which a query message is to be communicated to the desired audience.

Interests and Intents

As discussed above, generating recommendation clusters may be based on criteria that considers how closely the interests and intentions of the source member match the interests and intentions of the members of the candidate members. For example, the social networking service may define one or more predefined personas for all members. These personas may be broken down into two components: intent—i.e., the various reasons that members use the social networking service (e.g., job searching, connection forming, or the like), and interests, i.e., various things members are interested in (e.g., patent law, software engineering, or the like). The social networking service may assign probabilities for each predefined intent category and probabilities for each predefined interest category. The probability reflects the likelihood that based on information and observed activity known to the social networking service, the member has one of the predefined intent and interests. For example, a member who is actively viewing pages regarding job opportunities and includes profile attributes indicating interest in software development may be determined to have a high probability of a job seeking intent and a high probability of being interested in software development. This may be implemented in some examples based upon training sets of data in which members are manually classified into the various categories based upon the information the social networking service knows about them. These manually classified member profiles may then be used as training data for a classification algorithm. For example, a Bayesian classifier may be used.

The interests and intent of the source member, as determined by the system, may be matched with members who have corresponding interests and intents. Members with interests and intent corresponding to that of the source member may have a higher likelihood of being recommended to the source member for an out-of-network communication. For example, the source member may be a recruiter interested in software engineers. These source members may be matched with software engineers who are looking for a job. Note that as described, both interests and intent are used as selection criteria, but in some examples, only interests or only intent may be utilized.

To determine the interests and intent of the source members, the system may use the same techniques described above. In particular, the system may examine past out-of-network communications to determine the interests and intent of the source member. For example, if a particular member sends a lot of out-of-network communications to patent attorneys who are looking for new jobs, the system may determine the intent of the source member is that of a recruiter or employer and the interest is patent law. In yet other examples, the system may explicitly ask the source member about their interests and intents through dialogue boxes or other inputs.

The system may determine a score representing how closely the interests and intent of the source member matches the interests and intent of the members in the set of potential recommended members. For example the system may maintain a list of interests and intents that correspond to each other. For example, a recruiter intent may be listed as corresponding to intents such as a job-seeker intent. Corresponding intents may include more than two intents. For example, an intent to use the social networking service to meet new people (e.g., to network) may correspond to a recruiter intent, a networking intent, a sates intent (e.g., to use the social networking service to sell products or services), or the like.

In addition, the list of corresponding interests and intents may contain a similarity score. For example, a recruiter intent may correspond with both a job-seeker intent and a networking intent, but may correspond more with the job-seeker intent. Thus a member with a job-seeker intent would score higher than one with a networking intent.

In addition to predefined lists and scores based on those lists, the system may also utilize one or more of the previously discussed clustering algorithms to cluster groups of members with corresponding interests and intents. The score may then be based upon how close the various interests and intents of the potential recommended member is to the interests and intents of the source member.

Example Computer Systems

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
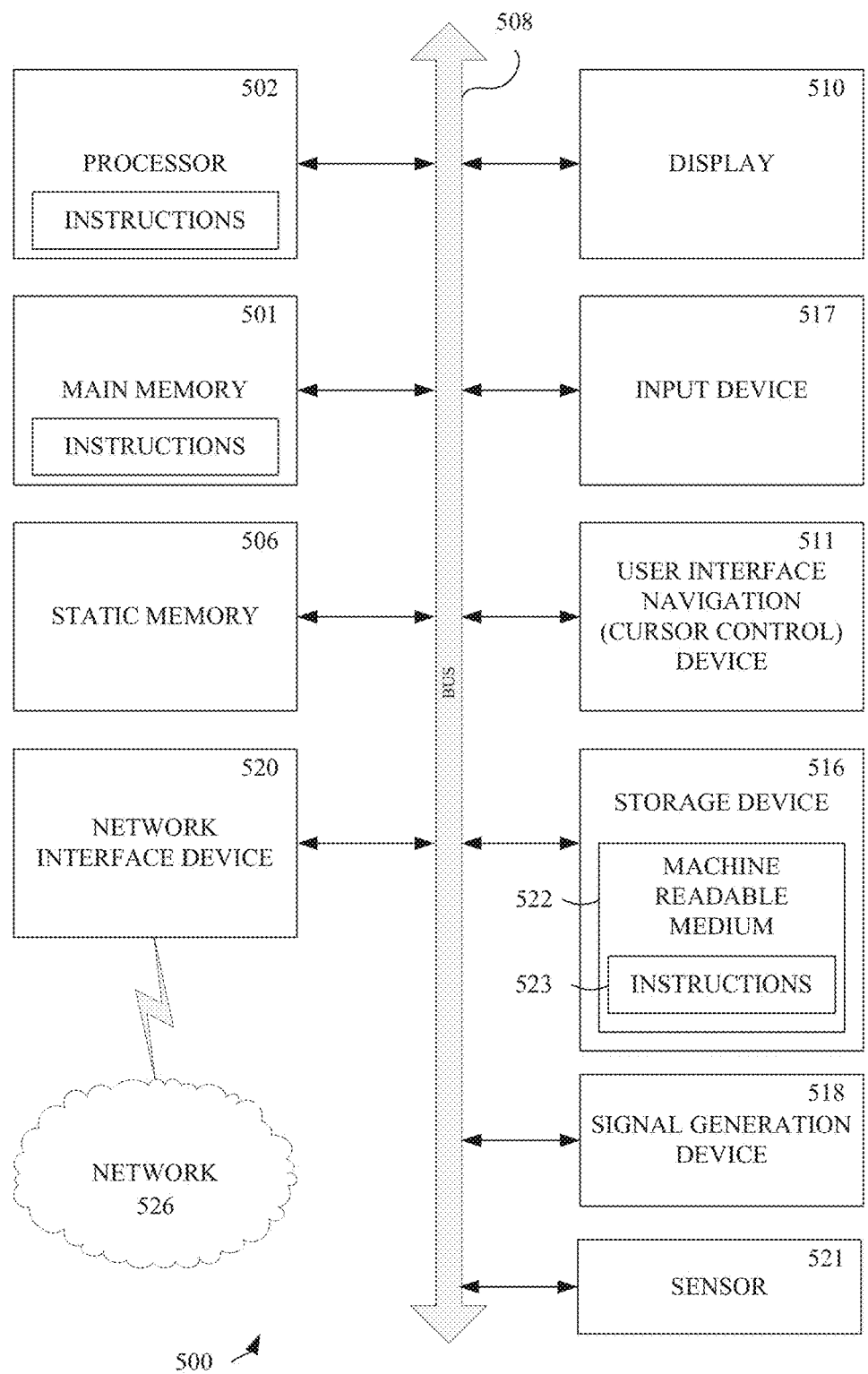
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 5 (e.g., a central processing unit (CPU), a graphics processing unit (GRU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 521, such as a global positioning system sensor, compass, accelerometer, or other sensor.

The drive unit 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term. "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

We claim:

1. A method comprising:

identifying a first member of a social networking service;

determining, based on previous communications transmitted by the first member to sample members of the social networking service, that the first member is a recruiter;

selecting, based on member attributes of the sample members, a cluster category including at least a first member attribute shared by one or more of the sample members;

identifying, based on the first member attribute, a set of candidate members that share the first member attribute, the set of candidate members including at least one member that is not included in the sample members;

for each candidate member, determining a probability value, the probability value being a numerical value indicating a likelihood that the respective candidate member is interested in job opportunities;

generating, by one or more processors, a recommendation cluster from the set of candidate members, wherein generating the recommendation cluster comprises:

ranking the set of candidate member profiles based on the respective probability value corresponding to each candidate member profile from the set of candidate member profiles; and selecting, based on the ranking, a subset of the candidate members that are ranked highest, yielding the recommendation cluster, the subset of candidate members determined to be interested in job opportunities based on the ranking; and surfacing, through a user interface element displayed on a client device operated by the first member, one or more displays of member profiles for the subset of candidate members included in the recommendation cluster, wherein the user interface element includes a display of text characterizing the first member attribute that is a basis for the cluster category, and the text indicates a reason that the cluster category is relevant to the first member.

2. The method of claim 1, further comprising:
selecting an additional cluster category based on a different member attribute shared by another plurality of the sample members;
generating an additional recommendation cluster based on the selected additional cluster category, the generating comprising selecting member profiles that match the additional cluster category, the selected member profiles matching the additional cluster category forming the additional recommendation cluster; and
in conjunction with surfacing the one or more displays of the member profiles from the recommendation cluster, surfacing, to the client device operated by the first member, one or more displays of the member profiles from the additional recommendation cluster.

3. The method of claim 2, wherein the one or more displays of the member profiles from the recommendation cluster are surfaced in a first user interface element, and the one or more displays of the member profiles from the additional recommendation cluster are surfaced in a second user interface element.

4. The method of claim 1, further comprising, responsive to detecting activation of a control element of the user interface element, updating the user interface element to display different member profiles from the recommendation cluster.

5. The method of claim 1, wherein the first member attribute specifies at least one of:
an employer, a geographic location, a job title, an experience level, an education level, a degree type, or a skill.

6. The method of claim 1, wherein at least one of the candidate members lacks a connection to the first member in the social networking service.

7. The method of claim 6, wherein the sample members includes at least one member that lacks a member activity with the first member.

8. A computer system comprising:
one or more computer processors; and
a computer readable hardware storage device having instructions stored there on, which, when executed by the one or more computer processors, configure the computer system to:
identify a first member of a social networking service;
determine, based on previous communications transmitted by the first member to sample members of the social networking service, that the first member is a recruiter;
select, based on member attributes of the sample members, a cluster category including at least a first member attribute shared by one or more of the sample members;
identify, based on the first member attribute, a set of candidate members that share the first member attribute, the set of candidate members including at least one member that is not included in the sample members;
for each candidate member, determine a probability value indicating a likelihood that the respective candidate member is interested in job opportunities;
generating, by one or more processors, a recommendation cluster from the set of candidate members, wherein generating the recommendation cluster comprises:
ranking the set of candidate member profiles based on the respective probability value corresponding to each candidate member profile from the set of candidate member profiles; and
selecting, based on the ranking, a subset of the candidate members that are ranked highest, yielding the recommendation cluster, the subset of candidate members determined to be interested in job opportunities based on the ranking; and
surfacing, through a user interface element displayed on a client device operated by the first member, one or more displays of member profiles for the subset of candidate members included in the recommendation cluster, wherein the user interface element includes a display of text characterizing the first member attribute that is a basis for the cluster category, and the text indicates a reason that the cluster category is relevant to the first member.

9. The computer system of claim 8, wherein the instructions further configure the computing system to:
select an additional cluster category based on a different member attribute shared by another plurality of the sample members;
generate an additional recommendation cluster based on the selected additional cluster category, the generating comprising selecting member profiles that match the additional cluster category, the selected member profiles matching the additional cluster category forming the additional recommendation cluster; and
in conjunction with the surfacing of the one or more of the member profiles from the recommendation cluster, surface, to the client device operated by the first member, one or more displays of the member profiles from the additional recommendation cluster.

10. The computer system of claim 9, wherein the one or more displays of the member profiles from the recommendation cluster are surfaced in a first user interface element, and the one or more of the member profiles from the additional recommendation cluster are surfaced in a second user interface element.

11. The computer system of claim 8, wherein the instructions further configure the computer system to update the user interface element to display different member profiles from the recommendation cluster in response to detecting activation of a control element of the user interface element.

12. The computer system of claim 8, wherein the first member attribute specifies at least one of:
an employer, a geographic location, a job title, an experience level, an education level, a degree type, or a skill.

13. The computer system of claim 8, wherein at least one of the candidate members lacks a connection to the first member in the social networking service.

14. The computer system of claim 13, wherein the sample members includes at least one member that lacks a member activity with the first member.

15. A non-transitory computer-readable medium storing executable instructions thereon, which, when executed by one or more computer processors of a computing device, cause the computing device to perform operations including:
identifying a first member of a social networking service;
determining, based on previous communications transmitted by the first member to sample members of the social networking service, that the first member is a recruiter;
selecting, based on member attributes of the sample members, a cluster category including at least a first member attribute shared by one or more of the sample members;
identifying, based on the first member attribute, a set of candidate members that share the first member attribute, the set of candidate members including at least one member that is not included in the sample members;

for each candidate member, determining a probability value, the probability value being a numerical value indicating a likelihood that the respective candidate member is interested in job opportunities;

generating, by one or more processors, a recommendation cluster from the set of candidate members, wherein generating the recommendation cluster comprises:
  ranking the set of candidate member profiles based on the respective probability value corresponding to each candidate member profile from the set of candidate member profiles; and
  selecting, based on the ranking, a subset of the candidate members that are ranked highest, yielding the recommendation cluster, the subset of candidate members determined to be interested in job opportunities based on the ranking; and surfacing, through a user interface element displayed on a client device operated by the first member, one or more displays of member profiles for the subset of candidate members included in the recommendation cluster, wherein the user interface element includes a display of text characterizing the member attribute that is a basis for the cluster category, and the text indicates a reason that the cluster category is relevant to the first member.

* * * * *